Aug. 18, 1931.  W. H. SILVER  1,819,847
CULTIVATOR
Filed June 29, 1928  2 Sheets-Sheet 1
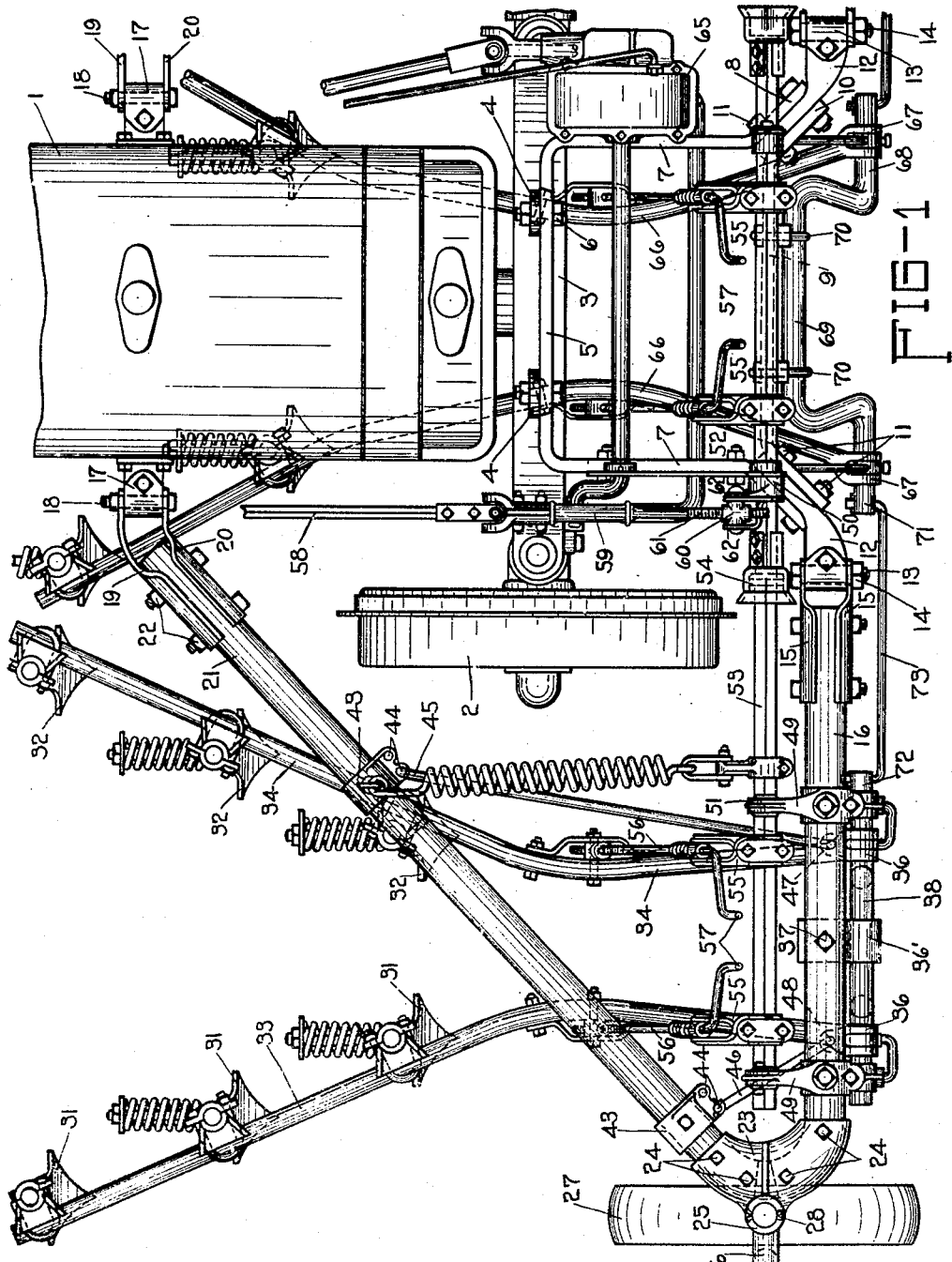

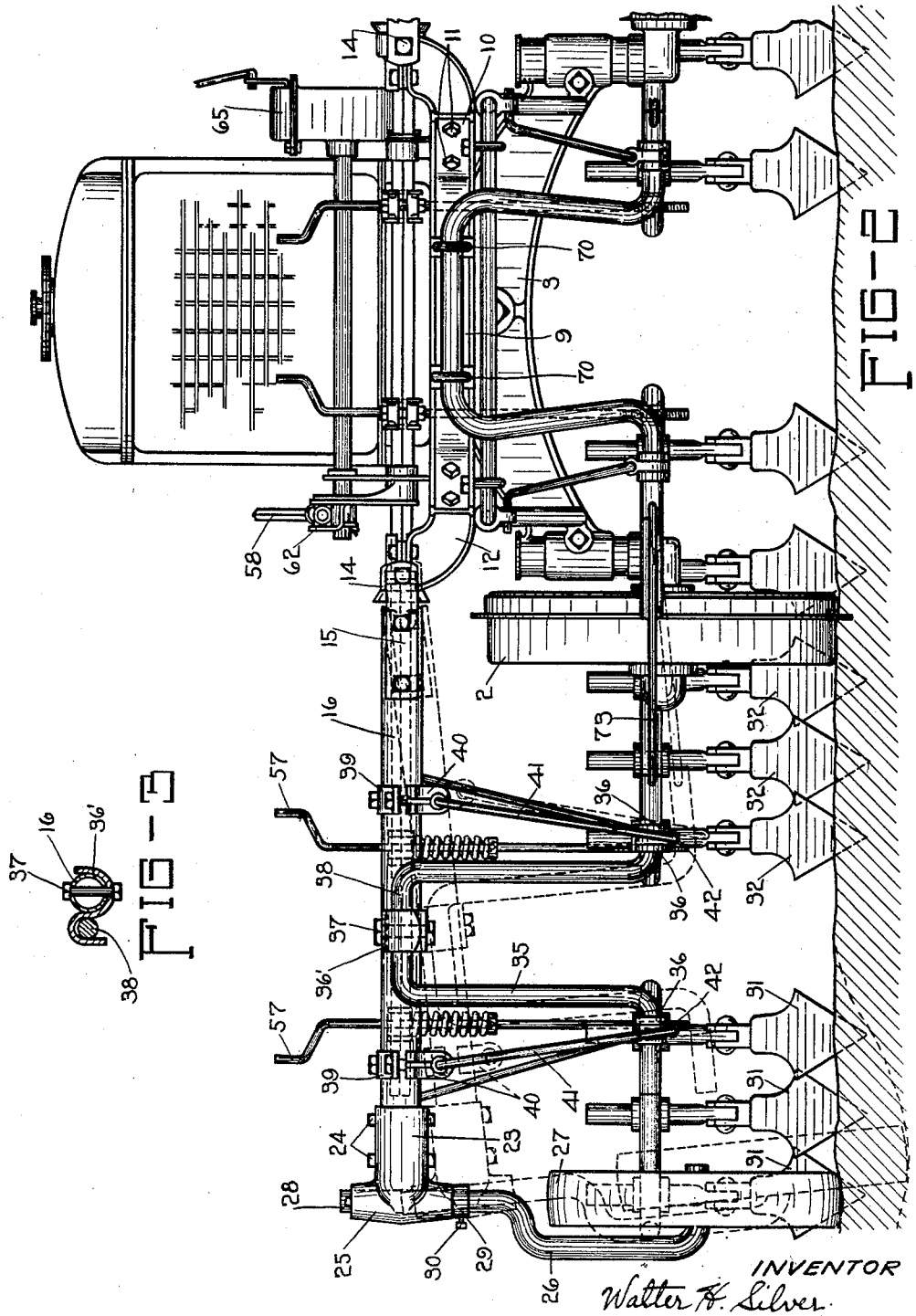

Patented Aug. 18, 1931

1,819,847

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

CULTIVATOR

Application filed June 29, 1928. Serial No. 289,122.

My invention relates to cultivators and more particularly to motor cultivators adapted to cultivate a plurality of rows simultaneously.

The main object of this invention is to provide such a cultivator with means for preventing relative lateral shifting of the shovel supporting rigs, such as would cause the cultivator shovels to cut into the corn rows when the outer rig wheel raises and lowers for passing over uneven ground.

These multiple row cultivators must frequently operate over uneven ground and, in order that the cultivator shovels will all cultivate to approximately the same depth, it has been the practice in this type of implement to provide a flexible frame consisting of a central frame section mounted on the tractor and two outrigger frame sections pivotally connected thereto, all three frame sections carrying cultivating rigs.

The outrigger frames are pivotally secured to the tractor in a manner which will be hereinafter described and this arrangement allows up and down movement of the outrigger wheels, which pass along on the ground between the rows.

The difficulty encountered by the use of this construction has been that since the outrigger frame is sufficiently high to escape the corn and avoid damage to the growing crop, it has been pivoted to the tractor at a relatively high point and thereby causing the shovels to swing considerably toward the corn row when the outer end of the frame was raised and lowered. By this invention the difficulty has been overcome as the outer rigs are secured to an arch member which is movable laterally with respect to the outrigger frame and the lower end of the arch member is secured by a rigid link member to the arch member of the central rig. This link member is pivotally secured to the ends of the two arch members, thereby permitting movement up and down but preventing lateral motion of that portion of the arch member to which the outer rigs are secured, and, consequently, preventing the shovels from relative lateral movement of sufficient magnitude to uproot the corn in the rows being cultivated.

My invention will be best understood by reference to the accompanying drawings in which Fig. 1 is a plan view of a motor cultivator with parts broken away and illustrating my invention;

Fig. 2 is a front elevational view of that shown in Fig. 1; and

Fig. 3 is an enlarged detail section to be hereinafter described.

Since the cultivator arrangement is symmetrical, the outrigger frame and rigs on the one side of the tractor have been omitted and the arrangement on the other side will be described in detail. I have shown in the drawings a tractor represented generally by numeral 1 and it may be of any desirable type having wheels 2, an arched axle 3 having ears 4 on the top thereof to which is rigidly secured a U-shaped bracket 5 by means of bolts 6. The ends of the U-shaped bracket extend forwardly as at 7, the extreme forward ends of which are bent at an angle, as shown at 8. A cross brace member 9 has forwardly turned end portions 10 spaced from the portions 8 of the bracket 5. A front pivoting bracket is interposed between the portions 8 and 10 and secured therebetween by means of bolts 11. This pivoting bracket 12 is provided on its forward end with a cylindrical portion 13 to which is secured by the pivot bolt 14, the clamping members 15 between which the front bar 16 of the outrigger frame is rigidly secured.

A pivot bracket 17 having bolt 18 therethrough is secured to the tractor toward the rear portion thereof and is arranged to secure in place the clamping members 19 and 20 between which the brace bar 21 of the outrigger frame is rigidly secured by bolts 22. The extreme outer ends of the bars 16 and 21 are rigidly secured together by means of the curved end casting 23 having bolts 24 therethrough.

The end casting 23 is provided with a vertical cylindrical portion 25 having an opening through which the supporting member 26 for the outrigger wheel 27 is arranged to pass. Suitable means is provided at 28 for preventing the member 26 from falling out of the member 25 and a thrust collar 29 having a set screw 30 is arranged on the member 26 below the portion 25 for preventing its upward movement and for adjusting the height of the outrigger frame to any desired point in order that the shovels 31 and 32 on the rigs 33 and 34, respectively, will engage the soil at the right pitch for cutting into the same as desired.

The rigs 33 and 34 are pivotally secured to the end portions of the rig arch 35 by means of brackets or clamping members 36, which are adjustable along the arch to permit inward and outward adjusting of the rig beams and shovels relatively to the plant row. The arch member 35 is supported vertically by means of the rig support bracket 36' which is rigidly secured on the bar 16 by bolt 37. The upper horizontal portion 38 of the arch member 35 is adapted to slide laterally through the bracket 36' as the bar 16 rises and lowers from its horizontal position, as shown in dotted outline in Fig. 2.

This arrangement is shown more in detail in Fig. 3 which illustrates the bar 16, the horizontal portion 38 and the S-shaped form of the bracket 36' secured in place by the bolt 37. Outer rig supporting brackets, or clamps 39, are mounted on the bar 16 and are provided with downwardly extending ears 40 having openings therein through which pass and are secured for lateral pivoting link members 41, the lower ends of which are pivotally supported in similar brackets 42 on the horizontal end portions of the arch member 35.

Collars 43 are secured on the bar 21 and the same are provided with a plurality of openings 44 through any of which the draft transmitting bars 45 and 46 may be pivotally secured. The bars 45 and 46 pass forwardly at an angle and engage in ears 47 and 48, respectively, of the clamping members 36. The arrangement above described is such that the forward end of the cultivator rig is held down sufficiently near the ground and is pushed forwardly by the bars 45 and 46 as the tractor is moved forwardly.

The bar 16 and the bracket member 5 are provided with suitable brackets 49 and 50 having bearing members 51 and 52 therein through which the rock shaft 53 is journaled. A universal joint 54 is interposed in the length of the rock shaft 53 for permitting tilting of the end with respect to the central portion. To the rock shaft 53 are rigidly secured brackets 55 having supporting bars 56 pivotally secured thereto and extending to the rigs 33 and 34 to which they are adjustably secured. The upper ends of the bars 56 have offset portions 57 thereon by which the same may be rotated for adjusting the depth of the cut which the shovels will make in the soil.

This individual adjusting arrangement is old in the art and further description thereof is believed to be unnecessary. The master adjustment for changing the depth at which all of the shovels will operate comprises a manually operated shaft 58 having a forward extension 59 and a traveling nut 60 on the threaded end portion 61 arranged to oscillate a forked bracket 62 on the central portion of the rock shaft 53 for rocking the same.

All of the shovel rigs may be raised into transport position by means of a power operated lift clutch designated as a whole at 65 and the operation of which is clearly illustrated and described in the application for patent of Theophilus Brown, Serial No. 128,929, filed August 13, 1926. The center rigs are pivotally secured at 67 to the horizontal end portions 68 of the center rig arch 69 which is held in position by U bolts 70 onto the cross frame 9. The pivotal connections 67 are shiftable along the end portions 68 of the arch 69 to laterally adjust the two central rig beams relatively to the intermediate plant row.

The ends 71 and 72 of the center arch member 69 and the end arch member 35, respectively, are pivotally secured together by a link member 73 which is rigid and allows the member 35 to move vertically with respect to the member 69 but prevents endwise motion of the portions 71 and 72 with respect to each other, thereby insuring that the shovels will follow along the corn rows and will not dig into or uproot the corn when the caster wheels 27 drop into a rut or depression or raise over a knoll, as the case may be. This operation is more clearly shown in Fig. 2 in which the arch member 35 is shown in dotted outline in the position it assumes when the caster wheel drops into a depression.

As the outrigger frame swings down, as indicated, the normal tendency is for the inner shovel 31 of the outer gang to swing inwardly toward the plant row in a position where it may cut into the plants or damage the roots of the stalks, and this is what tends to happen when the cultivator shovels swing directly with the outrigger frame in the prior constructions. Such inward shifting of the outer shovels toward the plant row is successfully eliminated or prevented, however, in the present construction by virtue of the action of the link 73 tending to hold the shovels carried by the outrigger frame at a substantially definite spacing from the shovels carried by the central frame portion. Such link serves to effect a relative shifting or displacement between the arch member 35 and the outrigger frame in the tilting movement of said outrigger frame. For example, when the frame drops down, as indicated in dotted lines in Fig. 2, the link 73 operates to shift the arch member 35 outwardly in the guide clamp 36', thus preventing the innermost shovel 31 of the outer gang from moving in toward the plant row. Similarly, when the outrigger frame swings upwardly as the caster wheel 27 rides along the ridge or passes over a knoll, the link 73 effects relative shifting between the outrigger frame and the arch member in the opposite direction. That is to say, with such upward swinging movement the tendency is for the outer shovel of the gang 32 to swing outwardly toward the plant row, but such is prevented by the action of the link 73 causing the arch member 35 to slide inwardly in the guide clamp 36', thereby holding this inner series of shovels 32 at substantially the same spacing from the plant row that these shovels had when the outrigger frame was horizontal.

It will be apparent to those skilled in the art that I have provided a novel combination wherein the outrigger frame is allowed sufficient flexibility for permitting the rigs to move up and down as the contour of the soil may require, and by the arrangement shown lateral relative movement of the rigs and shovels thereon is prevented which avoids the difficulty heretofore encountered of having the shovels move laterally and dig into the corn rows. It will be apparent that this arrangement is susceptible of certain variations without departing from the spirit of the invention, and I do not intend to be limited to the specific details herein set forth but desire to avail myself of such variations and modifications as come within the scope of the appended claims.

I claim as my invention:

1. A cultivator comprising in combination a central rig supporting frame, an outrigger frame pivotally secured thereto for relative up and down movement, shovel rigs supported by said frames, the rigs of one of said frames being movable laterally relative thereto, and means for preventing lateral movement of the shovel rigs of one frame relative to those of the other frame.

2. A cultivator comprising in combination a main frame, supporting wheels therefor, means on said frame for supporting shovel rigs, an auxiliary frame secured at one side of said main frame and arranged for floating movement relative thereto, shovel rigs supported by said auxiliary frame and shiftable laterally relative thereto, and means for preventing lateral movement of the rigs of one frame relative to the rigs of the other frame.

3. A cultivator comprising in combination a central rig frame, a rig supporting arch on said frame, an outrigger frame secured to said central rig frame for floating movement relative thereto, a rig supporting arch on said outrigger frame movable laterally with respect thereto, cultivator rigs on each of said arch members, and means for preventing lateral shifting of said arch members relative to each other.

4. A cultivator comprising in combination a central rig supporting frame and an outrigger frame, arch members supported thereby, shovel rigs supported on said arch members, means providing for floating action of said outrigger frame with respect to said central rig supporting frame, means connecting said arch members, and means connecting the outrigger frame and the arch member supported thereby for relative lateral shifting movement.

5. A cultivator comprising in combination a main frame, supporting wheels therefor, means on said frame for supporting shovel rigs, said means comprising an arch member secured thereto, the lower ends of said arch member extending laterally, an outrigger frame at one side of said main frame secured thereto and adapted to oscillate in a vertical plane, a rig supporting arch member shiftably supported by said outrigger frame, and means securing the lower end of said arch member with the lower end of the first said arch member for preventing relative lateral shifting thereof.

6. A cultivator comprising in combination a central rig supporting frame, an arch member supported by said frame, center cultivator rigs on said frame, an outrigger frame secured for vertical pivotal movement relative to the central frame, an arch member movably supported by said outrigger frame for lateral movement, outer rigs secured to said arch member, and means securing the lower ends of both of said arch members together for preventing relative lateral shifting thereof while permitting vertical oscillation of said outrigger frame.

7. A cultivator comprising in combination a central rig supporting frame, an arch member supported by said frame, central cultivator rigs on said frame, an outrigger frame secured for vertical pivotal movement relative to said central frame, an arch member for said outrigger frame, outer rigs secured to said arch member, means engaging said outrigger frame and the upper portion of said arch providing for relative lateral shifting thereof, and means securing the lower portion of the latter arch member to said first named arch member for preventing relative lateral shifting thereof.

8. A cultivator comprising in combination a central rig supporting frame, an arch member supported by said frame, central cultivator rigs on said frame, an outrigger frame secured for vertical pivotal movement relative to the central frame, an arch member for said outrigger frame, link members securing said arch to said outrigger frame and arranged to permit relative lateral movement thereof, shovel rigs on the lower end of said arch member and a link member connecting both of said arch members for preventing relative lateral shifting thereof, and draft members extending from said outrigger frame to said rigs.

9. A cultivator comprising in combination, a central rig supporting frame, central rig beams supported thereby, an outrigger frame secured to said central frame for vertical pivotal movement relative thereto, outer rigs supported by said outrigger frame and shiftable laterally relative thereto, and a link member for securing the rigs of one frame against relative lateral movement with respect to the rigs of the outer frame.

10. A cultivator comprising in combination, a central rig supporting frame, an arch member secured thereto, center cultivator rigs secured to said arch member and supported by said frame, an outrigger frame on each side of said central frame, said outrigger frames being pivotally secured to said central frame and adapted to oscillate vertically, caster wheels on the ends of said outrigger frames, outer cultivator rigs on said outrigger frames arranged to oscillate vertically therewith and shiftable laterally relative thereto, and means for retaining said outer rigs from relative lateral movement when said wheels pass through a depression in the soil.

11. A cultivator comprising in combination a central rig supporting frame, an arch member supported by said frame, central cultivator rigs secured to said arch member and to said frame, an outrigger frame secured for vertical pivotal movement relative to the central frame, a wheel supporting the outer portion of said outrigger frame an arch member for said outrigger frame, means for securing said arch member to said outrigger frame, said means comprising link members pivotally secured at their upper ends to said outrigger frame for lateral swinging movement, the lower ends of said link members engaging clamping members on said arch member, draft rods extending from a portion of said outrigger frame to said clamping members on the lower ends of said arch member for holding said arch member against fore and aft swinging, means for vertically adjusting the outer end of said outrigger frame relative to said wheel, outer rigs secured to said arch member, and means for preventing lateral shifting of said outer rigs when the outer end of said outrigger frame is adjusted vertically.

12. A cultivator comprising in combination a central rig supporting frame, an arch member supported by said frame, central cultivator rigs secured to said arch member and to said frame, an outrigger frame on each side of said central frame and pivotally secured thereto for vertical oscillation, outer arch members on said outrigger frames, shovel rigs on said outer arch members, vertical adjusting means for said shovel rigs, means providing for relative lateral shifting of said outrigger frames and the upper portion of said arch members, and a link securing the lower portion of each of said outer arch members to said first named arch member for preventing relative lateral shifting thereof.

13. A cultivator of the class described comprising in combination a central row following unit, a lateral row following unit pivotally connected to the central row following unit for rising and lowering movement relative thereto, arch members on each of said units, the arch members on said lateral units being movable laterally relative thereto, cultivator rigs on each of said arch members, and transverse connecting means between the arch member of the central unit and the arch member of the lateral unit for preventing relative lateral movement of the rigs.

14. A cultivator comprising in combination a central rig supporting frame, an outrigger frame connected for pivotal movement vertically relative thereto, cultivator rigs supported by said frames and movable laterally relative thereto, cultivator shovels carried by said rigs, and means for maintaining said shovels in substantially the same lateral relation to the plant rows being cultivated as the outrigger frame rises and falls.

15. A cultivator comprising in combination a central rig supporting frame, an outrigger frame connected for vertical movement relative thereto, cultivator rigs supported by said frames and movable laterally relative thereto, cultivator shovels carried by said rigs, and means for preventing movement of the shovels carried by the outrigger frame toward the plant rows being cultivated during vertical movement of the outrigger frame.

16. A cultivator comprising in combination, a central rig frame, a rig supporting arch on said frame, an outrigger frame connected to said central rig frame for floating movement relative thereto, a rig supporting arch on said outrigger frame shiftable laterally relative thereto, cultivator rigs on each of said arch members, and means for preventing lateral shifting of said arch members relative to each other.

17. A cultivator comprising in combination a central rig supporting frame and an outrigger frame, arch members supported thereby, shovel rigs supported on said arch members, means providing for floating movement of said outrigger frame with respect to said central rig supporting frame, means providing for relative lateral shifting of the outrigger frame and the arch member supported thereby, and a rigid link pivotally connecting the lower ends of said arch members for permitting vertical movement therebetween and preventing lateral movement of one with respect to the other.

18. A cultivator comprising a first cultivating rig adapted to cultivate along one side of one plant row, a second cultivating rig adapted to cultivate along one side of another plant row, means connecting said rigs permitting said second rig to rise and fall relatively to said first rig in passing over uneven ground, and means for retaining said second rig in substantially definite lateral relation to its plant row in such rising and falling movement.

19. A cultivator comprising two wheel supported frame structures, means connecting said frame structures permitting one of said frame structures to rise and fall relatively to the other in passing over uneven ground, a shifting member supported on one of said frame structures and movable laterally relatively thereto, a cultivating rig connected with said shifting member, and means connecting said shifting member with the other frame structure for maintaining said rig in substantially uniform lateral spacing with respect to its plant row in the rising and falling movement of the frame structure on which said rig is mounted.

In witness whereof I have hereunto set my hand this 25th day of June, A. D. 1928.

WALTER H. SILVER.